United States Patent
Rekow et al.

(10) Patent No.: US 6,789,014 B1
(45) Date of Patent: Sep. 7, 2004

(54) DIRECT MODIFICATION OF DGPS INFORMATION WITH INERTIAL MEASUREMENT DATA

(75) Inventors: Andrew Karl Wilhelm Rekow, Waterloo, IA (US); Frederick William Nelson, Waukee, IA (US); Dave Mercer, Ankeny, IA (US); Terence Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/435,067

(22) Filed: May 9, 2003

(51) Int. Cl.$^7$ ................................................ G01C 21/00
(52) U.S. Cl. ................... 701/214; 701/205; 701/210; 701/221; 701/224; 340/995.21; 180/9.38; 180/9.44
(58) Field of Search ..................... 701/214, 200, 701/202, 205, 207, 210, 213, 220, 221, 224, 36, 41, 1, 23, 26; 73/178 R; 340/988, 995.21; 180/9.38, 9.44

(56) References Cited

U.S. PATENT DOCUMENTS

| | | | |
|---|---|---|---|
| 5,617,317 A | 4/1997 | Ignagni | 364/449.9 |
| 5,657,025 A | 8/1997 | Ebner et al. | 342/357 |
| 5,680,306 A * | 10/1997 | Shin et al. | 180/167 |
| 5,838,562 A * | 11/1998 | Gudat et al. | 701/213 |
| 5,917,448 A | 6/1999 | Mickelson | 342/442 |
| 5,928,309 A | 7/1999 | Korver et al. | 701/214 |
| 5,956,250 A * | 9/1999 | Gudat et al. | 701/26 |
| 5,986,547 A | 11/1999 | Korver et al. | 340/500 |
| 6,243,649 B1 | 6/2001 | Wetherbee et al. | 701/214 |
| 6,373,403 B1 | 4/2002 | Korver et al. | 340/988 |
| 6,401,023 B1 * | 6/2002 | Takahashi | 701/70 |

* cited by examiner

Primary Examiner—Thomas G. Black
Assistant Examiner—Olga Hernandez
(74) Attorney, Agent, or Firm—Suiter West PC LLO

(57) ABSTRACT

A global positioning system based navigation system for a ground vehicle, in particular an agricultural ground vehicle such as a tractor, combine, sprayer, or the like, includes an inertial compensation assembly that provides inertial augmentation to compensate global positioning system based navigation information such as position, course, and track spacing for errors caused by variation of ground vehicle attitude (i.e., roll and yaw) over non-level terrain.

67 Claims, 6 Drawing Sheets

DIRECT MODIFICATION OF DGPS INFORMATION WITH INERTIAL MEASUREMENT DATA

FIELD OF THE INVENTION

The present invention generally relates to the field of global positioning system (GPS) based navigation systems for ground vehicles, in particular agricultural ground vehicles such as tractors, combines, sprayers, cotton pickers, or the like, and more specifically, to a global positioning system based navigation system that is capable of providing inertial compensation for ground vehicle attitude as the ground vehicle traverses non-level or uneven terrain.

BACKGROUND OF THE INVENTION

A shortcoming of global positioning system based navigation systems used in agricultural ground vehicles is that the global positioning system receiver of such systems can only determine the position of the global positioning system antenna. On most ground vehicles, the mounting location for the global positioning system antenna is constrained by the requirement that a clear view of the sky, and thus the global positioning system satellites, be provided to the antenna. Unfortunately, this position is usually not the desired control point (e.g., the hitch point of a tractor, the ground vehicle axle, a point on the ground beneath the hitch point of a tractor, or the like) for most ground vehicle applications. Consequently, when traversing non-level terrain (e.g., terrain having a slope, hills, valleys, or the like), the global positioning system determined position and course of the ground vehicle may be incorrect, resulting in cross-track and heading errors.

In order to calculate the position of the desired control point, a precise measurement of the spatial orientation (attitude) of the ground vehicle with respect to the navigation coordinate system must be made. One approach to measuring the attitude of the ground vehicle is to mount multiple global positioning system antennas to the vehicle in a fixed, known geometry. When precision global positioning system measurements are made, the relative positions of the multiple antennas, as measured in the navigation frame, can be used to calculate the orientation (position, attitude, and course) of the entire ground vehicle. However, a navigation system employing this approach would require multiple precision global positioning system receivers and would thus be prohibitively expensive.

Alternatively, an inertial system may be used in conjunction with the global positioning system. In this approach, the inertial system determines the primary position and course information for guiding or steering the ground vehicle. Information provided by the global positioning system is then used to correct drift of the position and course information determined by the inertial system. Inertial systems include gyroscopes for measuring roll, yaw and pitch, and may include accelerometers for improving the accuracy of the information measured by the gyroscopes. Consequently, such inertial systems, like multiple antenna systems, are prohibitively expensive for many applications Accordingly, it would be desirable to provide a navigation system that employs inertial augmentation to compensate global positioning system based navigation information such as position, course, and track spacing for errors caused by variation of the ground vehicle attitude (i.e., roll and yaw) over non-level terrain, but which does not require the full suite of gyroscopes and accelerometers provided by a conventional inertial system.

SUMMARY OF THE INVENTION

The present invention is directed to a navigation system for a ground vehicle, in particular, an agricultural ground vehicle such as a tractor, combine, sprayer, cotton picker, or the like. The navigation system employs inertial augmentation to compensate global positioning system based navigation information such as position, course, track spacing, or the like, for errors caused by variation of ground vehicle attitude (i.e., roll and yaw) over non-level terrain. In this manner, the accuracy of the navigation system is increased without undue expense.

In accordance with a first aspect of the present invention, a navigation system for a ground vehicle is disclosed. In an exemplary embodiment, the navigation system includes a global positioning system receiver assembly for receiving a positioning signal from a global positioning system and generating navigation information including the position (e.g., latitude and longitude) and course of the ground vehicle and a navigation control system interconnected with the global positioning system receiver assembly to provide assisted steering of the ground vehicle. An inertial compensation assembly is coupled to the global positioning system receiver assembly and the navigation control system. The inertial compensation assembly replaces the position and course generated by the global positioning system receiver assembly with a corrected position and a corrected course that are inertially compensated for roll and yaw of the ground vehicle to provide corrected navigation information that is passed to the navigation control system, which uses the information for steering the ground vehicle. The inertial compensation assembly may further calculate the slope of the non-level terrain. The navigation control system may then use the slope to determine the effective track spacing of an implement associated with the ground vehicle (e.g., towed by the ground vehicle or mounted to the ground vehicle).

In accordance with a second aspect of the present invention, a method for steering a ground vehicle traversing non-level terrain is disclosed. In an exemplary embodiment, the method includes the steps of receiving a positioning signal from a global positioning system; generating navigation information for the ground vehicle, which includes a position and course for the ground vehicle; stripping the position and course from the generated navigation information; replacing the position and course stripped from the navigation information with a corrected position and a corrected course that are inertially compensated for roll and yaw of the ground vehicle for providing corrected navigation information; and steering the ground vehicle using the corrected navigation information. The method may further include the step of calculating the slope of non-level terrain traversed by the ground vehicle in order to determine the effective track spacing of an implement associated with the ground vehicle.

In accordance with a third aspect of the present invention, an inertial compensation assembly for a navigation system of a ground vehicle is disclosed. The inertial compensation assembly operates in cooperation with the navigation system's global positioning system receiver assembly and steering assembly. In exemplary embodiments, the inertial compensation assembly comprises a gyroscope assembly for determining the yaw angle of the ground vehicle, an accelerometer assembly for determining the lateral acceleration of the ground vehicle, and a processing assembly. The processing assembly replaces the position and course information generated by the global positioning system receiver assembly with corrected position and course information that are inertially compensated for roll and yaw of the ground vehicle to provide corrected navigation information. The processor assembly generates the corrected position and course information using the yaw angle measured by the gyroscope assembly and the lateral acceleration measured by the accelerometer assembly so that the corrected navigation information is inertially compensated for roll and yaw of the ground vehicle over non-level terrain. The corrected navigation information is passed to the navigation control system, which uses the information for steering the ground vehicle. The processing assembly may further calculate the slope of the non-level terrain being traversed by the ground vehicle, allowing the effective track spacing of an implement associated with the ground vehicle to be determined.

In accordance with a fourth aspect of the present invention, a method for determining an effective track spacing for an implement associated with a ground vehicle traversing non-level terrain (e.g., towed by the ground vehicle or mounted to the ground vehicle) is disclosed. In exemplary embodiments, the method includes the steps of determining a roll angle for the ground vehicle; ascertaining the slope of the non-level terrain using the determined roll angle; and calculating the effective track spacing, wherein the effective track spacing compensates for the slope of the non-level terrain. The ground vehicle may then be steered using the corrected track spacing so that the ground vehicle follows a track substantially parallel and tangential to a previously navigated track. In this manner, cross-track error in positioning of the implement may be reduced or eliminated.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
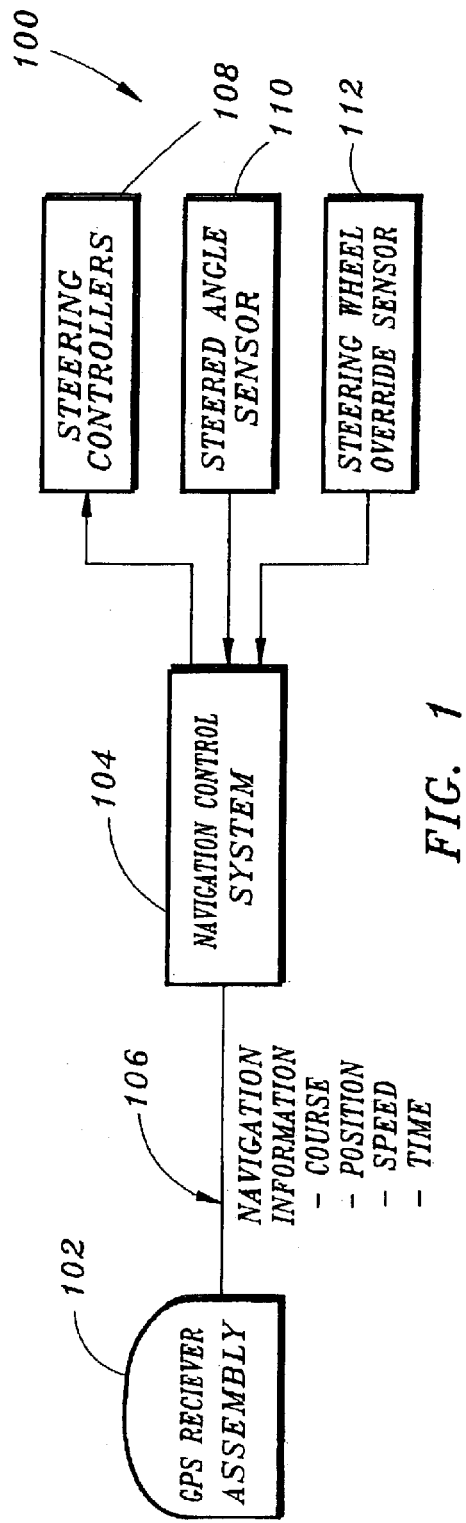
FIGS. 1 and 2 are block diagrams illustrating a global positioning system based navigation system capable of employing an inertial compensation assembly in accordance with an exemplary embodiment of the present invention.
Figure 2:
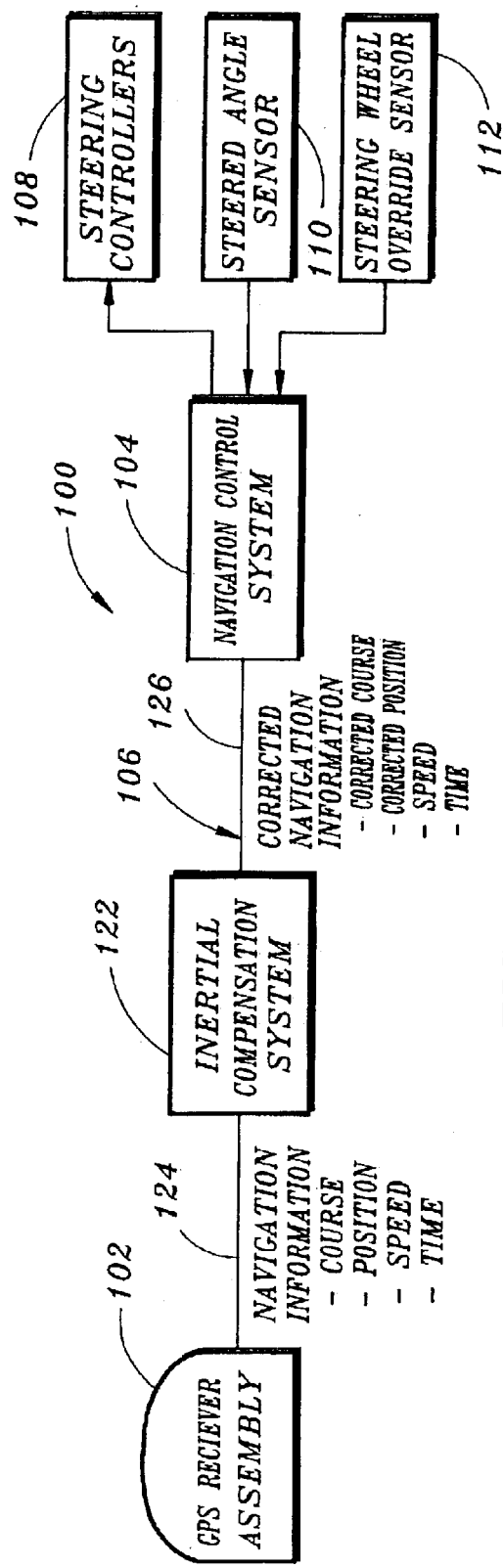

FIGS. 1 and 2 illustrate an exemplary global positioning system based navigation system 100 in accordance with the present invention. The navigation system 100 provides global positioning system based navigation and/or steering for a ground vehicle, in particular, an agricultural ground vehicle 116 (FIG. 3) such as a tractor, combine, sprayer, cotton picker, or, the like, as the ground vehicle 116 traverses a path or track within a field. In accordance with an aspect of the present invention, the navigation system 100 may employ inertial compensation to correct global positioning system navigation parameters such as position (e.g., latitude and longitude) and course or heading for errors caused by variation in ground vehicle attitude (i.e., ground vehicle roll and yaw) as the ground vehicle 116 traverses non-level terrain. The navigation system 100 may also be capable of determining the effective track spacing for the ground vehicle 116 or, alternately, an implement towed by the ground vehicle 116 by ascertaining the slope of the terrain being traversed by the ground vehicle 116.

In the embodiment shown in FIG. 1, the navigation system 100 comprises a global positioning system receiver assembly 102 and a navigation control system 104 interconnected in a bus architecture 106. The global positioning system receiver assembly 102 receives positioning signals from a global positioning system and generates global positioning system based navigation information including position (e.g., latitude and longitude), course or heading, speed, time, and the like, for use by the navigation control system 104 and other components of the navigation system 100. In exemplary embodiments, the global positioning system receiver assembly 102 receives positioning signals from the Global Positioning System (GPS), a space-based radio-navigation system managed by the United States Air Force for the Government of the United States. However, it is contemplated that the global positioning system receiver assembly 102 may alternately be adapted for use with other radio based navigation/global positioning systems such as the GLONASS Navigation Satellite System managed by the Russian Space Agency (RSA) for the Russian Federation. Additionally, in embodiments of the invention, the global positioning system receiver assembly 102 may be capable of receiving and utilizing enhanced positioning information provided by differential GPS systems and wide area differential GPS (WADGPS) such as the STARFIRE™ WDGPS system developed by John Deere and Company of Moline, Ill., the Wide Area Augmentation System (WAAS) provided by the Federal Aviation Administration of the United States Government, or the like. In such embodiments, the global positioning system receiver assembly 102 may include, or be coupled to, a radio receiver for receiving differential error correction information.

The navigation control system 104 uses the navigation information provided by the global positioning system receiver assembly 102 to furnish navigation or guidance information to the operator of the vehicle. Additionally, where automatic steering is employed, the navigation control system 104 uses the information to control vehicle steering controllers 108 which steer the vehicle along a desired path or track. For example, in embodiments of the invention utilized in agriculture (e.g., wherein the navigation system 100 is employed by agricultural vehicles such as tractors, combines, sprayers, cotton pickers, or the like), the navigation control system 104 may be capable of navigating, and, optionally, steering substantially parallel paths or tracks through a field for tillage of the field, application of chemicals such as herbicides and pesticides to crops growing in the field, harvesting of the crops from the field, and the like. Preferably, these tracks have a width (W) corresponding to the width of the implement 120 towed by the ground vehicle 116 and are spaced so that they are substantially parallel and tangential to one another to avoid gaps or overlap in coverage of the field.

In embodiments of the navigation system 100 wherein automated steering is provided, a steered angle sensor 110 provides feedback to the navigation control system 104 indicating the actual angle steered by the steering controllers 108 allowing the navigation control system to control the path or track steered by comparing the actual course steered from the steered angle sensor 110, the course and position provided by the global positioning system receiver assembly 102. In exemplary embodiments, a steering wheel override sensor 112 may also be provided. The steering wheel override sensor 112 senses movement of the steering wheel of the ground vehicle 116 by the operator to allow the operator of the ground vehicle 116 to override automatic steering functions provided by the navigation control system 104. In this manner, the operator may make course corrections or manually steer the ground vehicle 116 to avoid an obstacle in its path.

Figure 3:
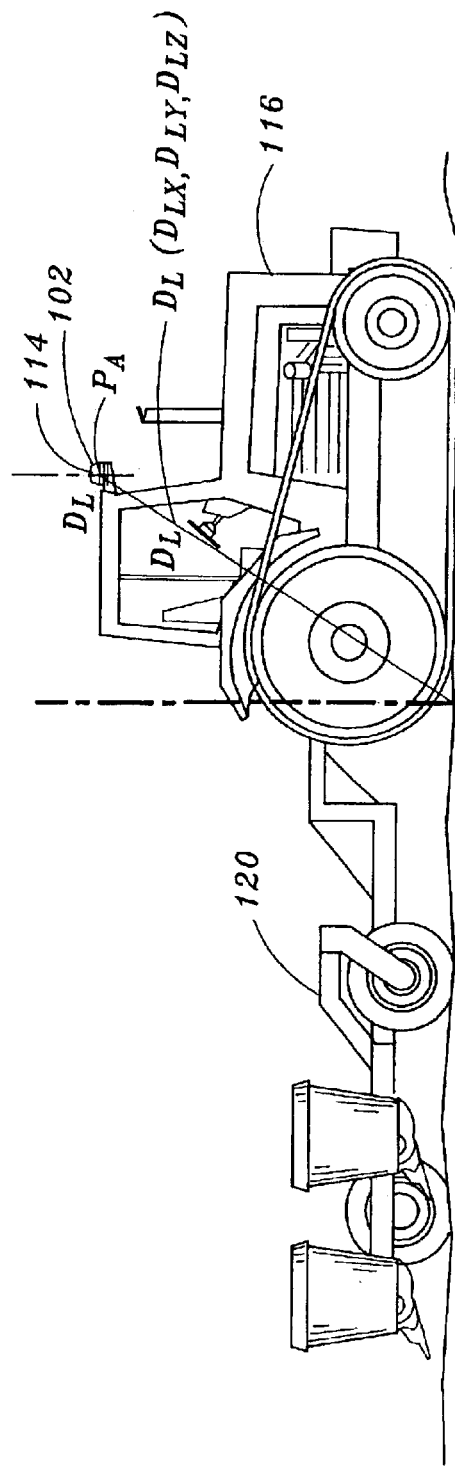
FIG. 3 is a side elevation view illustrating a ground vehicle traversing non-level terrain utilizing a navigation system in accordance with the present invention.
Figure 4:
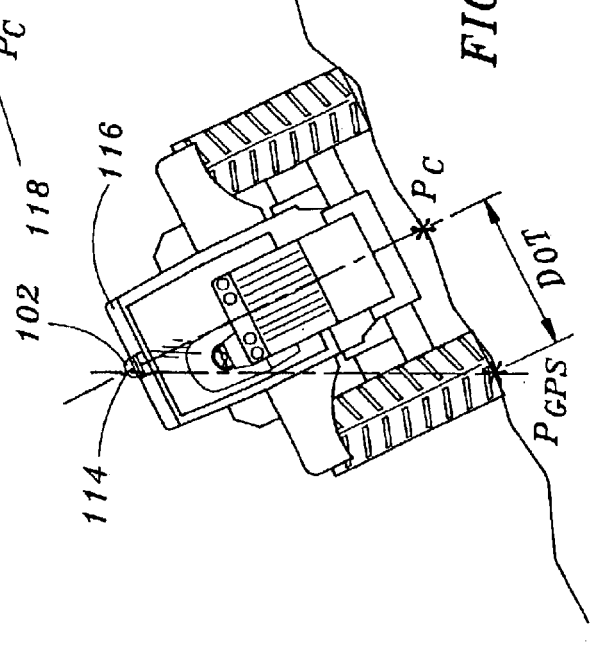
FIG. 4 is a front elevation view of the ground vehicle shown in FIG. 3, further illustrating the effect of roll of the ground vehicle on vehicle position.
Figure 5:
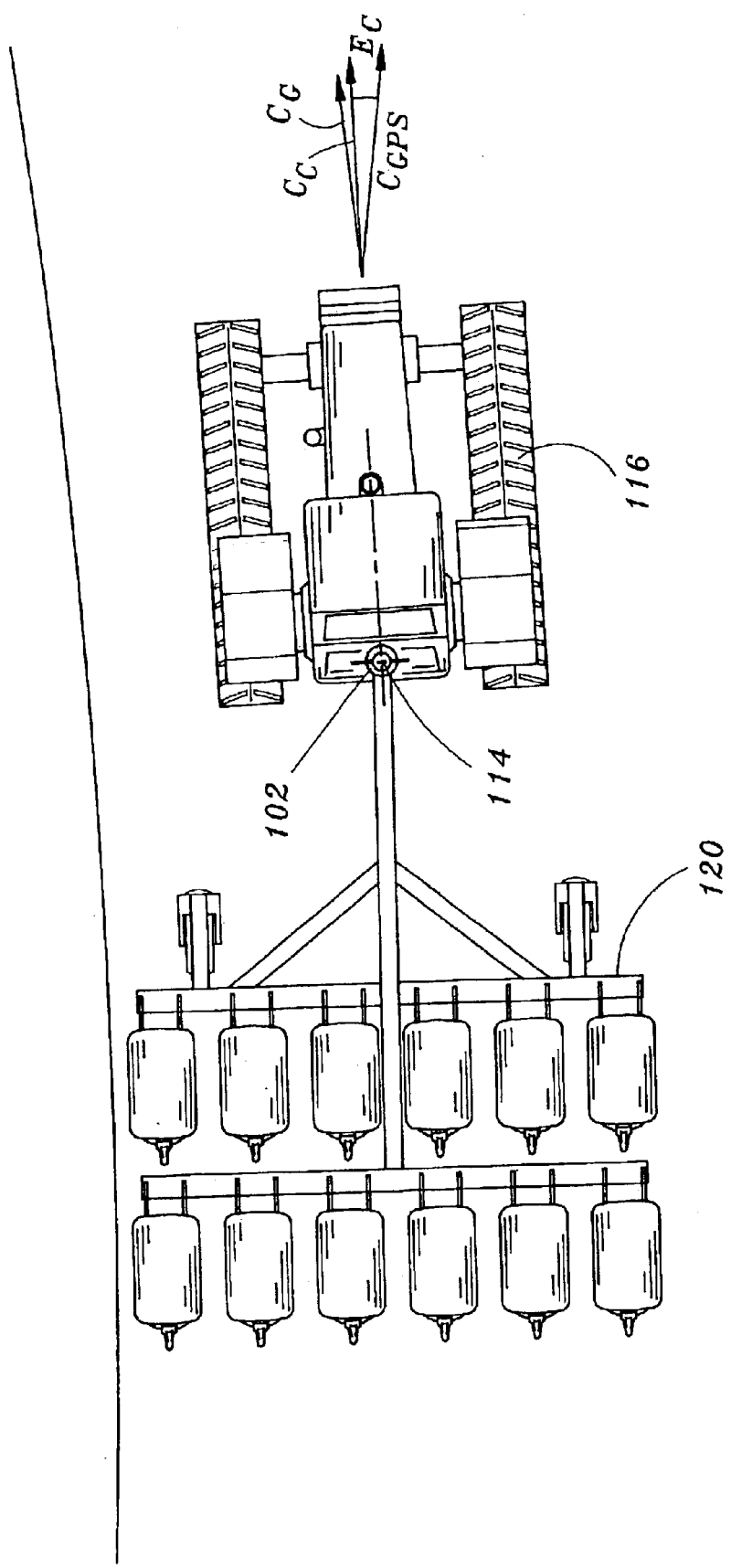
FIG. 5 is a top plan view of the ground vehicle shown in FIG. 3, further illustrating the effect of yaw of the ground vehicle on vehicle course.

As shown in FIG. 3, the global positioning system receiver assembly 102 of the navigation system 100 illustrated in FIG. 1, includes a global positioning system antenna 114 mounted to the ground vehicle 116 at a point ($P_A$) that provides a clear view of the sky, and thus the global positioning system satellites of the global positioning system employed. The point ($P_A$) where the global positioning system antenna 114 is mounted is separated from the desired control point ($P_C$) of the ground vehicle 116 and towed implement 120 (e.g., a point on the ground 118 beneath the ground vehicle 116) by a distance, commonly referred to in the art as lever arm ($D_L$) having a generally vertical lever arm component $D_{Lz}$ and generally horizontal lever arm components $D_{Lx}$, and $D_{Ly}$. Consequently, the navigation system 100, illustrated in FIG. 1, provides highly accurate navigation and or steering of the ground vehicle 116 over generally level terrain since the horizontal and vertical lever arm components $D_{Lx}$, $D_{Ly}$ and $D_{Lz}$, remain relatively constant. However, when traversing non-level terrain (e.g., terrain having a slope, hills, valleys, ruts, bumps, or the like), the horizontal and vertical lever arm components $D_{Lx}$, $D_{Ly}$ and $D_{Lz}$ vary with respect to one another as the ground vehicle 116 rolls and yaws. Consequently, the global positioning system determined position and course of the ground vehicle 116 may be incorrect, resulting in cross-track ($D_{OT}$) errors as shown in FIG. 4 and/or heading or course errors ($E_c$), as shown in FIG. 5.

To compensate for these errors, and thus allow the ground vehicle 116 to be steered more accurately over non-level terrain, the present invention employs an inertial compensation assembly 122 that is inserted between the global positioning system receiver assembly 102 and the navigation control system 104 as shown in FIG. 2. The inertial compensation assembly 122 dynamically measures roll and yaw of the ground vehicle 116 (FIGS. 3, 4, and 5) to compensate for errors in the position and course information provided by the global positioning system receiver assembly 102 as the ground vehicle 116 traverses non-level terrain. In the embodiment illustrated in FIG. 2, the inertial compensation assembly 122 communicates with the global positioning system receiver assembly 102 through a dedicated, private bus 124. The inertial compensation assembly 122 strips the position (e.g., latitude and longitude) and course information from the navigation information generated by the global positioning system receiver assembly 102 and replaces this information with corrected position (e.g., latitude and longitude) and course information that is compensated for errors induced by vehicle roll and yaw (e.g., due to sideslopes, hills, etc.) before sending the information to the navigation system 104 via the system bus 126. The inertial compensation assembly 104 passes all other information provided by the global positioning system receiver (e.g., speed, time, and the like) between the private bus 124 and the system bus 126 without modification. Further, because pass-to-pass distance for an implement may change as a function of grade, the inertial compensation assembly 122 may generate slope measurements, which are passed to the navigation system 104 via the system bus 124 with the corrected position and course information. In this manner, slope-compensated pass-to-pass track widths may be determined for the ground vehicle 116 or the implement 120 towed by the ground vehicle 116.

In exemplary embodiments, the inertially compensated navigation information provided by the inertial compensation assembly 122 is identical in format to uncompensated navigation information provided by the global positioning system receiver assembly 102. Thus, the inertially compensated navigation information comprising the inertially compensated position and course information from the inertial compensation assembly 122, along with uncompensated information such as speed, time, and the like, provided by the global positioning system receiver assembly 102 and passed to the system bus 124 by the inertial compensation assembly 122 may be utilized by the navigation control system 104 without additional modification or formatting to provide navigation information to the operator, and, optionally, to steer the ground vehicle 116 without modification of the information. In this manner, the inertial compensation assembly 122 may be added to the navigation system 100 to provide inertial augmentation of global positioning system based navigation information used by the system, without modification of existing components of the navigation system 100 such as the global positioning system receiver assembly 102 and navigation control system 104.

Figure 6:
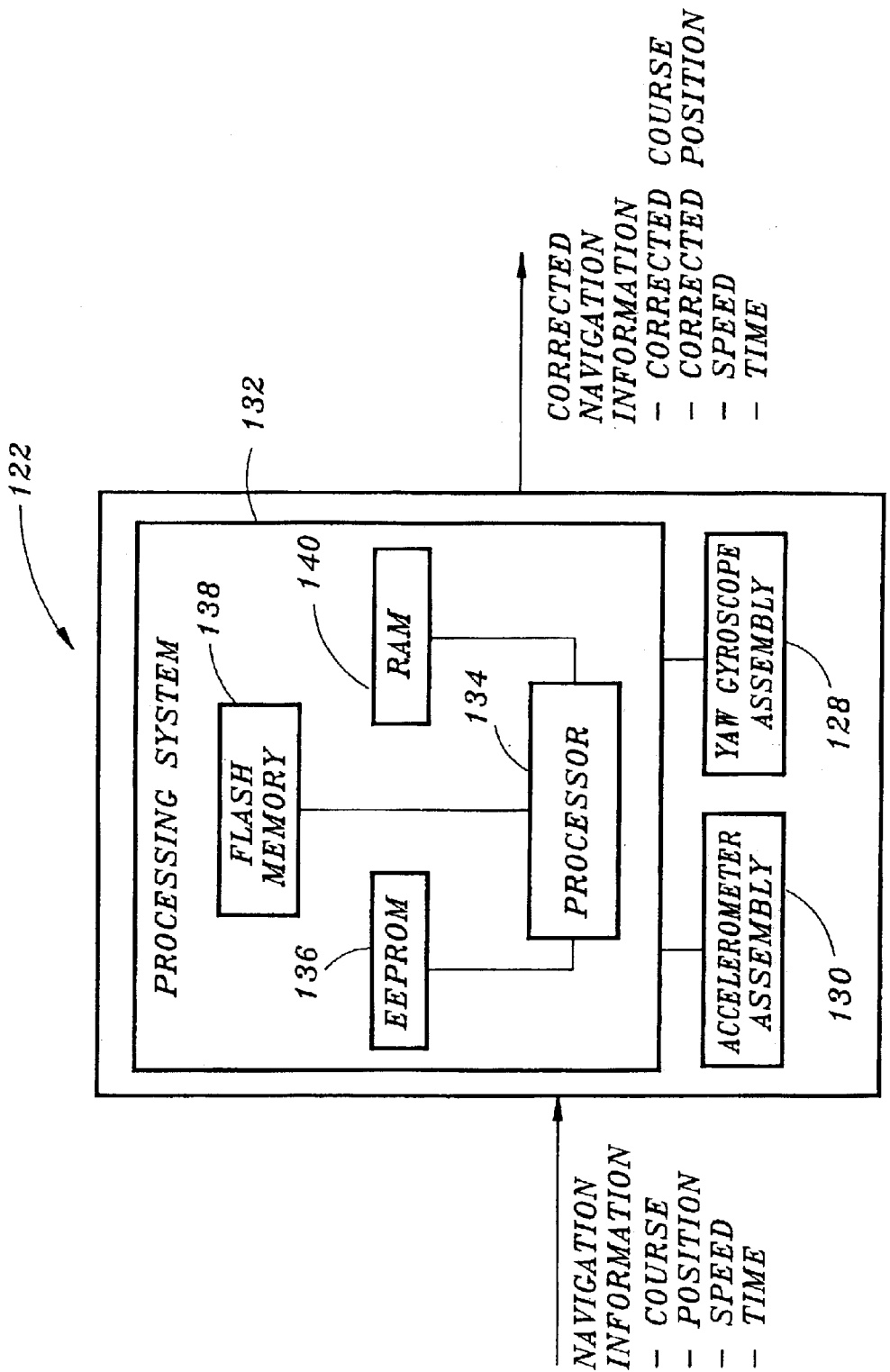
FIG. 6 is a block diagram illustrating the inertial compensation assembly of the navigation system shown in FIG. 2.

Referring now to FIG. 6, the inertial compensation assembly 122 of the navigation system 100 shown in FIG. 2 is described. The inertial compensation assembly 122 comprises a yaw gyroscope assembly 128 for measuring the yaw angle of the ground vehicle 116 (FIG. 3), an accelerometer assembly 130 for measuring the roll angle of the ground vehicle 116 as the ground vehicle 116 traverses non-level terrain, and a processing system 132 coupled to the gyroscope assembly 128 and accelerometer assembly 130 for determining position and course information for the ground vehicle 116. As shown in FIG. 6, the processing system 132 may, in one embodiment, include a processor 134 for performing position and course calculations, controlling communication with other components of the navigation system 100 (FIGS. 1 and 2), performing fault diagnosis, and the like, and memory such as EEPROM (electrically erasable programmable read-only memory) 136, Flash memory 138 and RAM (random access memory) 140 for storing software and/or firmware for the processing system 132, and parameters utilized by the processing system for calculating the corrected position and course.

In exemplary embodiments of the invention, the yaw gyroscope assembly 128 comprises a gyroscope that measures the yaw rate of the ground vehicle (e.g., ground vehicle 116 of FIG. 3). The processing system 132 utilizes the measured yaw rate to determine a true vehicle course (i.e., gyroscopic course), compensating for errors in the global positioning system course induced by vehicle roll and yaw. The global positioning system course provided by the global positioning system receiver assembly 102 is utilized to limit gyroscope drift. The global positioning system course may also be used to calibrate the bias and scale factor of the gyroscope during operation of the inertial compensation assembly 122. Further, because the gyroscopic course effectively provides a course measurement as observed at the vehicle pivot point (e.g.,.a rear axle of a tractor, or the like), the gyroscopic course is projected to the point on the ground vehicle 116 where the global positioning system receiver antenna 114 is physically located (e.g., point ($P_A$) of the ground vehicle 116 shown in FIG. 3) to provide a corrected course that is consistent with the course stripped from the navigation information provided by the global positioning system receiver assembly 102. The corrected course is then provided to the navigation control system 104 via the system bus 126.

In accordance with the present invention, the processing system 132 of the inertial compensation assembly 122 determines the corrected course using the equation:

$$C_C = [G_R/F_{MEAS}] + [(C_{GPS} - C_G) \cdot Kc/CFR] + Pf \quad \text{EQN.1}$$

where $C_C$ is the corrected course; $G_R$ is the yaw rate; $F_{MEAS}$ is the frequency of measurement of the yaw rate by the gyroscope assembly; $C_{GPS}$ is the course from the navigation information generated by the global positioning system receiver assembly; $C_G$ is the gyroscopic course; CFR is a course filter resolution variable; Kc is a variable filter value wherein CFR>Kc> some positive minimum value; and Pf is the value projecting the corrected course from a pivot point of the ground vehicle 116 to a point where the global positioning system receiver assembly is mounted to the ground vehicle 116.

As can be seen from review of EQN. 1, with reference to FIG. 5, the gyroscopic course $C_G$ measured by the gyroscope assembly takes precedence over the global positioning system course $C_{GPS}$ over time. For large discrepancies between the global positioning system course $C_{GPS}$ and the gyroscopic course $C_G$, the filter variable Kc is set to the course filter resolution CFR, resetting the gyroscopic course $C_G$ to the current global positioning system course $C_{GPS}$. Thereafter, the value of the filter variable Kc is reduced over time to a minimum value, giving the gyroscopic course $C_G$ precedence over the global positioning system course $C_{GPS}$. Preferably, the filter variable Kc has a non-zero minimum value so that at least a portion of the global positioning system course $C_{GPS}$, which by the inertial compensation assembly 122 as a reference, is weighted into the calculation of the corrected course $C_C$. Additionally, the gain and zero yaw rate scale factors may be adjusted under the appropriate conditions to compensate for drift of the gyroscope.

Referring again to FIG. 6, the accelerometer assembly 130 comprises an accelerometer for measuring lateral acceleration of the ground vehicle (e.g., ground vehicle 116 of FIG. 3). In accordance with the present invention, the accelerometer assembly 130 measures no lateral acceleration when the ground vehicle 116 is level (i.e., as the ground vehicle 116 traverses substantially level terrain). However, as the ground vehicle 116 traverses non-level terrain, lateral tilt of the accelerometer assembly 132 due to roll of the ground vehicle 116 causes the accelerometer assembly 130 to measure a positive or negative component of acceleration with respect to gravity.

The processing system 132 uses the lateral acceleration measured by the accelerometer assembly 130 to calculate an off-track distance ($D_{OT}$) for the ground vehicle 116, which comprises an inertially calculated estimate of the lateral distance between the global positioning system determined position ($P_{GPS}$) and the actual position of a desired control point for the ground vehicle 116, typically a point projected to the ground below the global positioning system receiver antenna 116 (i.e., point ($P_C$) in FIGS. 3 and 4). The off-track distance $D_{OT}$ may thus be determined as the height of the accelerometer assembly 130 above the control point ($P_C$) (or, alternately, the height of the inertial compensation assembly 122 above the control point ($P_C$), if the inertial compensation assembly comprises a single unit containing the accelerometer assembly 130) multiplied by the sine of the angle of lateral tilt of the ground vehicle 116. The off-track distance ($D_{OT}$) may then be used to correct the global positioning system determined position ($P_{GPS}$) to provide a corrected position for the ground vehicle 116, compensated for lever arm $D_L$, which more closely approximates the actual position of the ground vehicle 116.

In calculating corrected position, the processing system 132 may also compensate for centrifugal (high speed) accelerations incurred during turns of the ground vehicle 116. This compensation is accomplished, in one exemplary embodiment of the invention, by dynamically comparing changes in the position of the ground vehicle 116 with respect to the course of the ground vehicle 116. Therefore, the off-track distance ($D_{OT}$) may be determined as the sum of the distance due to slope acceleration and the distance due to high speed acceleration, where the slope acceleration is equal to the lateral acceleration measured by the accelerometer assembly 130 less any radial acceleration and high speed roll acceleration of the ground vehicle 116. However, the sine of the angle of tilt of the ground vehicle 116 is equal to the lateral acceleration determined by the accelerometer assembly (A) divided by the acceleration of gravity (g). Consequently, the distance due to slope acceleration is the height of the accelerometer assembly ($H_A$) added to the lateral acceleration determined by the accelerometer assembly (A) divided by the acceleration of gravity (g).

Accordingly, the processing system 132 may calculate the off-track distance $D_{OT}$ for the ground vehicle 116 using the equation:

$$D_{OT} = (H_A \cdot A/g) + D_{HSA} \quad \text{EQN.2}$$

where $D_{OT}$ is the off-track distance of the ground vehicle 116; $H_A$ is the height of the accelerometer assembly above a desired control point such as the ground (e.g., point ($P_C$)); A is the lateral acceleration determined by the accelerometer assembly 130; g is the acceleration due to gravity; and $D_{HSA}$ is the distance due to centrifugal (high speed) acceleration measured, in exemplary embodiments of the invention, by dynamically comparing changes in the position of the ground vehicle 116 with respect to the course of the ground vehicle 116. Preferably, once calculated the off-track distance $D_{OT}$ is divided into latitude and longitude components and added to the global positioning system position, which is likewise measured in latitude and longitude, to provide a corrected position (i.e., latitude and longitude) for the ground vehicle 116.

In agricultural applications where the ground vehicle 116 is associated with an implement for depositing material such as seed, fertilizer, pesticide, herbicide, or the like, to the surface of a field (e.g., the ground vehicle 116 tows the implement 120 or, alternatively, the implement is mounted to the ground vehicle 116), the pass-to-pass track width for the implement may vary as a function of the grade or slope of the terrain due to the pull of gravity on the material deposited (e.g., dropped, sprayed, or the like). Consequently, as the ground vehicle 116 is steered along parallel tracks over non-level terrain having a lateral slope with respect to the implement, overlapping of tangential tracks may occur if the track width selected is too wide. This overlap results in uneven application of the material being deposited, wasting material and possibly reducing the yield from the field if the track width is not adjusted accordingly.

In exemplary embodiments of the invention, the lateral acceleration measured by the accelerometer assembly 130 may also be used by the processing system 132 to determine the roll angle of the ground vehicle 116, from which the slope (S) of the terrain being traversed by the ground vehicle 116 may be ascertained. The slope (S) may then be used by the navigation control system 104 to determine the effective track width or spacing of the implement 120. In this manner, slope-compensated pass-to-pass track widths may be determined for the implement 120 in real time, and may be adjusted as the slope of the terrain being traversed by the ground vehicle 116 increases or decreases.

Figure 7:
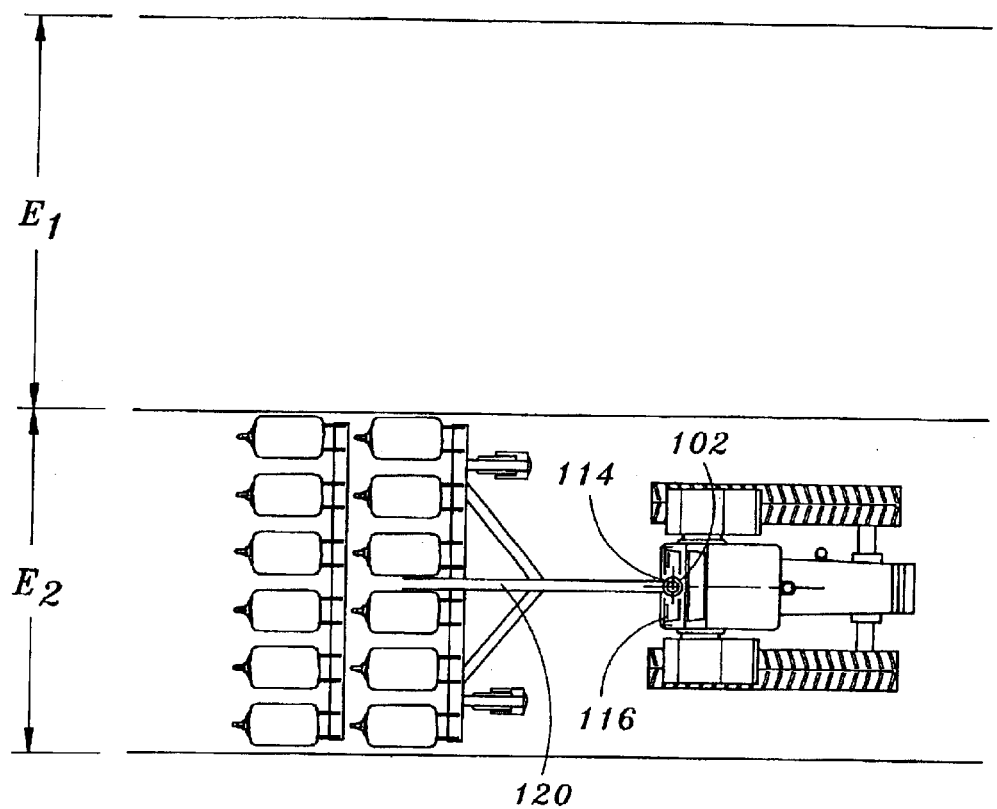
FIG. 7 is a top plan view of the ground vehicle shown in FIG. 3, illustrating the effect of the slope of the terrain being traversed by the ground vehicle on the effective track spacing of an implement towed by the ground vehicle.
Figure 8:
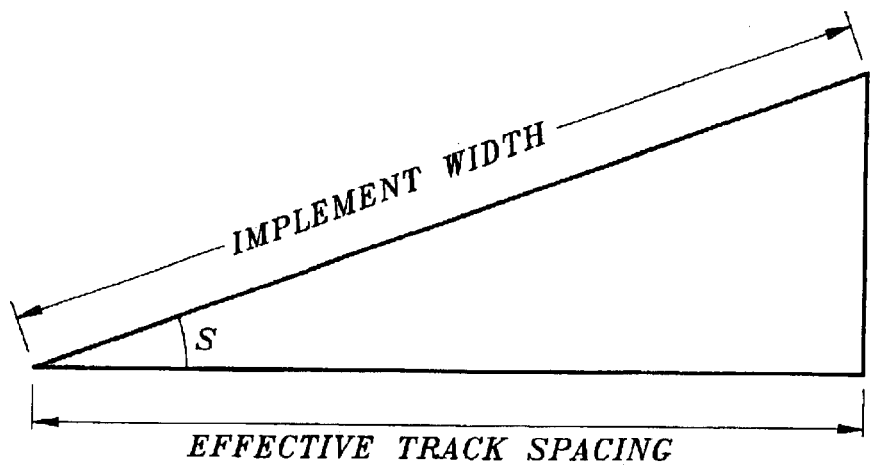
FIG. 8 is a schematic view further illustrating the relationship between the effective width of the track of the ground vehicle or implement towed by the ground vehicle and the slope of the terrain being traversed by the ground vehicle.

FIGS. 7 and 8 illustrate the effect of the slope (S) of the terrain traversed by an exemplary ground vehicle 116 on the effective track width (E) for an implement 120 towed by the ground vehicle 116. As shown in FIG. 7, the effective track width (E) decreases as the lateral slope or grade of terrain traversed by the ground vehicle 116 increases. Thus, the effective track width ($E_1$) of a track followed by the ground vehicle 116 when traversing terrain having a lateral slope will be greater than the effective track width ($E_2$) of a track followed by the ground vehicle 116 traversing terrain having little or no slope. Thus, as shown in FIG. 8, the effective track width (E) for an implement for a given slope (S) is related to the track width of the implement on level terrain by the equation:

$$E = I \cdot \cos(S) \qquad \text{EQN. 3}$$

where E is the effective track width, I is the track width of the implement on level terrain, and S is the slope.

In exemplary embodiments, the inertial compensation assembly 122 may be calibrated prior to use or during use to improve the accuracy of the corrected position and course determination. For example, the accelerometer assembly 130 may include one or more temperature sensors for measuring the temperature of the accelerometer, thereby allowing the processing system 132 to compensate for variations in the lateral acceleration measured by the accelerometer assembly 130 due to temperature-induced accelerometer offset error and sensitivity error. To calibrate the accelerometer temperature response, the inertial compensation assembly 122 may be calibrated under known conditions (e.g., at the time of manufacture) to correlate the output of the temperature sensor with respect to the actual ambient temperature, and to characterize the offset error over a temperature range. The processing system 132 may store the calibration data in memory (e.g., flash memory 138) to be used for correcting roll angle measurements for changes in the accelerometer temperature.

The inertial compensation assembly 122 may further be calibrated to identify the zero degree (0°) roll angle of the ground vehicle 116. This calibration may be performed each time the internal compensation assembly 122 is installed within the navigation system 100 of a ground vehicle 116. The operator of the ground vehicle 116 may accomplish this calibration, manually, by positioning the ground vehicle 116 in a stationary, level position and identifying to the processing system 132 of the inertial compensation assembly 122 that the ground vehicle 116 is stationary and level (e.g., through controls provided by the navigation control system 104). Alternately, the operator may calibrate the zero degree (0°) roll angle by driving the ground vehicle 116 back and forth along a straight path, thereby allowing the inertial compensation assembly 122 to determine the zero degree (0°) roll angle by comparing the roll angle measurements of the ground vehicle 116 at various points along the path traversed.

Because the inertial compensation assembly 122 does not itself generate position and course information, but instead employs inertial measurements to augment position and course information furnished by the global positioning system receiver assembly 102, the gyroscope assembly 128 and accelerometer assembly 130 need comprise only a single accelerometer for measuring lateral acceleration of the ground vehicle 116 and a single yaw gyroscope for measuring yaw rate of the ground vehicle 116, respectively. Consequently, the inertial compensation assembly 122 of the present invention does not require a full suite of gyroscopes and accelerometers typically required by prior inertial measurement systems. Accordingly, the inertial compensation assembly 122 is simpler, contains fewer components, and is less costly to manufacture than such systems. However, it will be appreciated that the inertial compensation assembly 122 may comprise additional gyroscopes for redundancy, to provide increased precision of the yaw rate and lateral acceleration measurements. Such modification of the inertial compensation assembly 122 would not depart from the scope and intent of the present invention.

Figure 9:
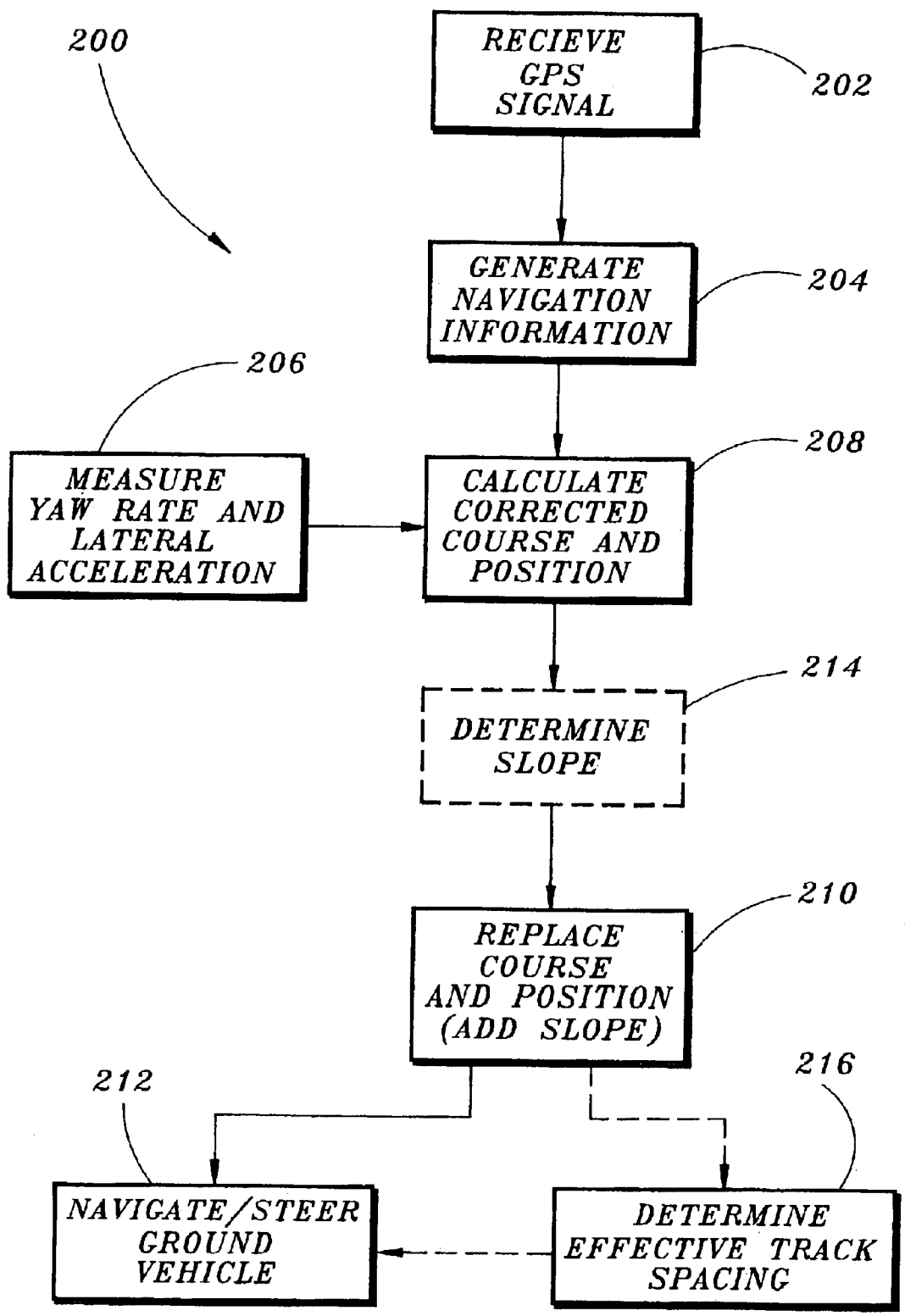
FIG. 9 is a flow diagram illustrating a method for augmenting global positioning system based position and course information utilized by a navigation system in a ground vehicle wherein the position and course information is inertially compensated for roll and yaw of the ground vehicle as the ground vehicle traverses non-level terrain.

Referring now to FIG. 9, an exemplary method 200 is described for augmenting global positioning system based position and course information utilized by a navigation system in a ground vehicle, wherein the position and course information is inertially compensated for roll and yaw of the ground vehicle as the ground vehicle traverses non-level terrain. As shown in FIG. 9, global positioning system positioning signals are received from a global positioning system at step 202, and used for generating global positioning system based navigation information including position (e.g., latitude and longitude), course or heading, speed, time, and the like, at step 204. The yaw rate and lateral acceleration of the ground vehicle are also measured, at step 206, using a gyroscope assembly and an accelerometer assembly, respectively. A corrected position and course compensated for roll and yaw of the ground vehicle as the ground vehicle traverses non-level terrain may then be calculated for the ground vehicle, at step 208, using global positioning system based position and course from the generated navigation information and the measured yaw rate and lateral acceleration of the ground vehicle. For example, in exemplary embodiments of the invention, the corrected course may be calculated using EQN. 1, discussed in the description of FIG. 6, while the corrected position may be determined by calculating an off-track distance for the ground vehicle using EQN. 2, also discussed in the description of FIG. 6, where the off-track distance is split into latitude and longitude components and added to the global positioning system based position (latitude and longitude). The position and course is then stripped from the global positioning system based navigation information generated at step 204 and replaced, at step 210, with the corrected position and course calculated at step 208, for providing corrected navigation information for the ground vehicle. In exemplary embodiments of the invention, the corrected navigation information may then be used for navigating and/or steering the ground vehicle, at step 212.

As shown in FIG. 9, the lateral acceleration measured by the accelerometer assembly at step 206 may further be used to determine the roll angle of the ground vehicle 116, from which, the slope (S) of the terrain being traversed by the ground vehicle 116 may be determined, at step 214. The slope (S) may then be used by the navigation control system 104 to determine the effective track width or spacing of an implement towed by the ground vehicle at step 216. The effective track width determined at step 216 may then be used to aid in navigating or steering the ground vehicle at step 212 where parallel steering or automatic steering of the ground vehicle is provided. In this manner, slope-compensated pass-to-pass track widths may be determined for the implement in real time, and may be adjusted as the slope of the terrain being traversed by the ground vehicle increases or decreases.

In exemplary embodiments, the methods disclosed may be implemented as sets of instructions comprising software or firmware readable by the processing system 132 of the inertial compensation assembly 122, the global positioning system receiver assembly 102, or components of the navigation control system 104. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A navigation system for a ground vehicle, comprising:
a global positioning system receiver assembly for receiving a positioning signal from a global positioning system and generating navigation information for the ground vehicle, the navigation information including a position and course for the ground vehicle;
a navigation control system interconnected with the global positioning system receiver assembly for steering the ground vehicle; and
an inertial compensation assembly coupled to the global positioning system receiver assembly and the navigation control system for replacing the position and course with a corrected position and a corrected course that are inertially compensated for roll and yaw of the ground vehicle to provide corrected navigation information to the navigation control system, the inertial compensation assembly comprising a gyroscope assembly for measuring a yaw rate of the ground vehicle and an accelerometer assembly for measuring a lateral acceleration of the ground vehicle, the inertial compensation assembly using the measured yaw rate and lateral acceleration for generating the corrected position and course by calculating an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle,
wherein the navigation control system uses the corrected navigation information for steering the ground vehicle.

2. The navigation system as claimed in claim 1, wherein the inertial compensation assembly calculates a gyroscopic course from the yaw rate measured by the gyroscope assembly.

3. The navigation system as claimed in claim 2, wherein the inertial compensation unit determines the corrected course using the equation:

$$C_C = [G_R/F_{MEAS}] + [(C_{GPS} - C_G) \cdot Kc/CFR] + Pf$$

where $C_C$ is the corrected course; $G_R$ is the yaw rate; $F_{MEAS}$ is the frequency of measurement of the yaw rate by the gyroscope assembly; $C_{GPS}$ is the course from the navigation information generated by the global positioning system receiver assembly; $C_G$ is the gyroscopic course; Kc is a variable filter value; CFR is a course filter resolution variable; and Pf is a value projecting the corrected course from a pivot point of the ground vehicle to a point where the global positioning system receiver assembly is mounted to the ground vehicle.

4. The navigation system as claimed in claim 1, wherein the gyroscope assembly comprises a single yaw gyroscope.

5. The navigation system as claimed in claim 1, wherein the inertial compensation assembly determines the off-track distance using the equation:

$$D_{OT} = (H_A \cdot A/g) + D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity, and $D_{HSA}$ is the distance due to high speed acceleration.

6. The navigation system as claimed in claim 1, wherein the accelerometer assembly comprises a single accelerometer.

7. The navigation system as claimed in claim 1, wherein the inertial compensation assembly further calculates the slope of the non-level terrain from the measured lateral acceleration of the ground vehicle, the slope being added to the corrected navigation information.

8. The navigation system as claimed in claim 7, wherein the navigation control system a uses the slope to determine the effective track spacing of an implement towed by the ground vehicle.

9. The navigation system as claimed in claim 8, wherein the effective track spacing is calculated by the equation:

$$E = I \cdot \cos(S)$$

where E is the effective track spacing, I is the track width of the implement on level terrain, and S is the slope.

10. A method for steering a ground vehicle traversing non-level terrain, comprising:
receiving a positioning signal from a global positioning system;
generating navigation information for the ground vehicle, the navigation information including a position and course for the ground vehicle;
replacing the position and course stripped from the navigation information with a corrected position and a corrected course that are inertially compensated for roll and yaw of the ground vehicle for providing corrected navigation information; and
steering the ground vehicle using the corrected navigation information,
wherein the step of steering the ground vehicle using the corrected navigation information comprises steering the ground vehicle so that the ground vehicle follows a track substantially parallel to a previously navigated track.

11. The method as claimed in claim 10, wherein the step of replacing the position and course stripped from the navigation information comprises determining a yaw angle for the ground vehicle using a gyroscope assembly and determining lateral acceleration of the ground vehicle using an accelerometer assembly, the lateral acceleration and the yaw angle being used for generating the corrected position and course.

12. The method as claimed in claim 11, further comprising calculating a yaw rate and a gyroscopic course from the yaw angle.

13. The method as claimed in claim 12, wherein the corrected course is determined using the equation:

$$C_C = [G_R/F_{MEAS}] + [(C_{GPS} - C_G) \cdot Kc/CFR] + Pf$$

where $C_C$ is the corrected course; $G_R$ is the yaw rate; $F_{MEAS}$ is the frequency of measurement of the yaw rate; $C_{GPS}$ is the course from the navigation information generated by the global positioning system receiver assembly; $C_G$ is the gyroscopic course; Kc is a variable filter value; CFR is a course filter resolution variable; and Pf is the previous course projected from a control point of the ground vehicle to the global positioning system receiver assembly.

14. The method as claimed in claim 11, wherein the gyroscope assembly comprises a single yaw gyroscope.

15. The method as claimed in claim 11, wherein the step of replacing the position and course stripped from the navigation information comprises calculating an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

16. The method as claimed in claim 15, wherein the off-track distance is determined using the equation:

$$D_{OT} = (H_A \cdot A/g) + D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

17. The method as claimed in claim 11, wherein the accelerometer assembly comprises a single accelerometer.

18. The method as claimed in claim 10, further comprising calculating the slope of non-level terrain, the slope being added to the corrected navigation information.

19. The method as claimed in claim 18, further comprising determining an effective track spacing of an implement towed by the ground vehicle using the slope.

20. The method as claimed in claim 19, wherein the effective track spacing is calculated by the formula:

$$E = I \cdot \cos(S)$$

where E is the effective track spacing, I is the track width of the implement on level terrain, and S is the slope.

21. An inertial compensation assembly for a navigation system of a ground vehicle, the navigation system including a global positioning system receiver assembly for receiving a positioning signal from a global positioning system and generating navigation information for the ground vehicle and a navigation control system for steering the ground vehicle, the inertial compensation assembly comprising:
a gyroscope assembly for determining a yaw angle for the ground vehicle;
an accelerometer assembly for determining a lateral acceleration of the ground vehicle; and
a processing assembly coupled to the gyroscope assembly and accelerometer assembly for replacing the position and course information with corrected position and course information to provide corrected navigation information to the navigation control system for steering the ground vehicle,
wherein the processor assembly generates the corrected position and course information using the yaw angle measured by the gyroscope assembly and the lateral acceleration measured by the accelerometer assembly so that the corrected navigation information is inertially compensated for roll and yaw of the ground vehicle over non-level terrain.

22. The inertial compensation assembly as claimed in claim 21, wherein the processing assembly calculates a yaw rate and a gyroscopic course from the yaw angle measured by the gyroscope assembly.

23. The inertial compensation assembly as claimed in claim 22, wherein the processing assembly determines the corrected course using the equation:

$$C_C = [G_R/F_{MEAS}] + [(C_{GPS} - C_G) \cdot Kc/CFR] + Pf$$

where $C_C$ is the corrected course; $G_R$ is the yaw rate; $F_{MEAS}$ is the frequency of measurement of the yaw rate; $C_{GPS}$ is the course from the navigation information generated by the global positioning system receiver assembly; $C_G$ is the gyroscopic course; Kc is a variable filter value; CFR is a course filter resolution variable; and Pf is the previous course projected from a control point of the ground vehicle to the global positioning system receiver assembly.

24. The inertial compensation assembly as claimed in claim 21, wherein the gyroscope assembly comprises a single yaw gyroscope.

25. The inertial compensation assembly as claimed in claim 21, wherein the processing assembly calculates an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

26. The inertial compensation assembly as claimed in claim 25, wherein the processing assembly determines the off-track distance using the equation:

$$D_{OT}=(H_A \cdot A/g)+D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

27. The inertial compensation assembly as claimed in claim 21, wherein the accelerometer assembly comprises a single accelerometer.

28. The inertial compensation assembly as claimed in claim 21, wherein the processing assembly further calculates the slope of the non-level terrain, the slope being added to the corrected navigation information.

29. A navigation system for a ground vehicle, comprising:
a global positioning system receiver assembly for receiving a positioning signal from a global positioning system and generating navigation information for the ground vehicle, the navigation information including a position and course for the ground vehicle;
a navigation control system interconnected with the global positioning system receiver assembly for steering the ground vehicle; and
an inertial compensation assembly coupled to the global positioning system receiver assembly and the navigation control system for replacing the position and course with a corrected position and a corrected course that are inertially compensated for roll and yaw of the ground vehicle to provide corrected navigation information to the navigation control system, the inertial compensation assembly comprising a gyroscope assembly for measuring a yaw rate of the ground vehicle and an accelerometer assembly for measuring a lateral acceleration of the ground vehicle, the inertial compensation assembly using the measured yaw rate and lateral acceleration for generating the corrected position and course using the equation:

$$C_C=[G_R/F_{MEAS}]+[(C_{GPS}-C_G) \cdot Kc/CFR]+Pf$$

where $C_C$ is the corrected course; $G_R$ is the yaw rate; $F_{MEAS}$ is the frequency of measurement of the yaw rate by the gyroscope assembly; $C_{GPS}$ is the course from the navigation information generated by the global positioning system receiver assembly; $C_G$ is the gyroscopic course calculated by the inertial compensation assembly from the yaw rate measured by the gyroscope assembly; Kc is a variable filter value; CFR is a course filter resolution variable; and Pf is a value projecting the corrected course from a pivot point of the ground vehicle to a point where the global positioning system receiver assembly is mounted to the ground vehicle; and
wherein the navigation control system uses the corrected navigation information for steering the ground vehicle.

30. The navigation system as claimed in claim 29, wherein the gyroscope assembly comprises a single yaw gyroscope.

31. The navigation system as claimed in claim 29, wherein the inertial compensation assembly calculates an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

32. The navigation system as claimed in claim 31, wherein the inertial compensation assembly determines the off-track distance using the equation:

$$D_{OT}=(H_A \cdot A/g)+D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

33. The navigation system as claimed in claim 29, wherein the accelerometer assembly comprises a single accelerometer.

34. The navigation system as claimed in claim 29, wherein the inertial compensation assembly further calculates the slope of the non-level terrain from the measured lateral acceleration of the ground vehicle, the slope being added to the corrected navigation information.

35. The navigation system as claimed in claim 34, wherein the navigation control system a uses the slope to determine the effective track spacing of an implement towed by the ground vehicle.

36. The navigation system as claimed in claim 35, wherein the effective track spacing is calculated by the equation:

$$E=I \cdot \cos(S)$$

where E is the effective track spacing, I is the track width of the implement on level terrain, and S is the slope.

37. A navigation system for a ground vehicle, comprising:
a global positioning system receiver assembly for receiving a positioning signal from a global positioning system and generating navigation information for the ground vehicle, the navigation information including a position and course for the ground vehicle;
a navigation control system interconnected with the global positioning system receiver assembly for steering the ground vehicle; and
an inertial compensation assembly coupled to the global positioning system receiver assembly and the navigation control system for replacing the position and course with a corrected position and a corrected course that are inertially compensated for roll and yaw of the ground vehicle to provide corrected navigation information to the navigation control system, the inertial compensation assembly calculating the slope of the non-level terrain from the measured lateral acceleration of the ground vehicle, the slope being added to the corrected navigation information,
wherein the navigation control system uses the corrected navigation information for steering the ground vehicle.

38. The navigation system as claimed in claim 37, wherein the inertial compensation assembly comprises a gyroscope assembly for measuring a yaw rate of the ground vehicle and an accelerometer assembly for measuring a lateral acceleration of the ground vehicle, the inertial compensation assembly using the measured yaw rate and lateral acceleration for generating the corrected position and course.

39. The navigation system as claimed in claim 38, wherein the inertial compensation assembly calculates a gyroscopic course from the yaw rate measured by the gyroscope assembly.

40. The navigation system as claimed in claim 39, wherein the inertial compensation unit determines the corrected course using the equation:

$$C_C=[G_R/F_{MEAS}]+[(C_{GPS}-C_G)\cdot Kc/CFR]+Pf$$

where $C_C$ is the corrected course; $G_R$ is the yaw rate; $F_{MEAS}$ is the frequency of measurement of the yaw rate by the gyroscope assembly; $C_{GPS}$ is the course from the navigation information generated by the global positioning system receiver assembly, $C_G$ is the gyroscopic course; Kc is a variable filter value; CFR is a course filter resolution variable; and Pf is a value projecting the corrected course from a pivot point of the ground vehicle to a point where the global positioning system receiver assembly is mounted to the ground vehicle.

41. The navigation system as claimed in claim 38, wherein the gyroscope assembly comprises a single yaw gyroscope.

42. The navigation system as claimed in claim 38, wherein the inertial compensation assembly calculates an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

43. The navigation system as claimed in claim 42, wherein the inertial compensation assembly determines the off-track distance using the equation:

$$D_{OT}=(H_A\cdot A/g)+D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

44. The navigation system as claimed in claim 38, wherein the accelerometer assembly comprises a single accelerometer.

45. The navigation system as claimed in claim 37, wherein the effective track spacing is calculated by the equation:

$$E=I\cdot\cos(S)$$

where E is the effective track spacing, I is the track width of the implement on level terrain, and S is the slope.

46. A method for steering a ground vehicle traversing non-level terrain, comprising:
receiving a positioning signal from a global positioning system;
generating navigation information for the ground vehicle, the navigation information including a position and course for the ground vehicle;
replacing the position and course stripped from the navigation information with a corrected position and a corrected course that are inertially compensated for roll and yaw of the ground vehicle for providing corrected navigation information; and
steering the ground vehicle using the corrected navigation information,
wherein the step of replacing the position and course stripped from the navigation information comprises determining a yaw angle for the ground vehicle using a gyroscope assembly and determining lateral acceleration of the ground vehicle using an accelerometer assembly, the lateral acceleration and the yaw angle being used for generating the corrected position and course.

47. The method as claimed in claim 46, wherein the step of steering the ground vehicle using the corrected navigation information comprises steering the ground vehicle so that the ground vehicle follows a track substantially parallel to a previously navigated track.

48. The method as claimed in claim 46, further comprising calculating a yaw rate and a gyroscopic course from the yaw angle.

49. The method as claimed in claim 48, wherein the corrected course is determined using the equation:

$$C_C=[G_R/F_{MEAS}]+[(C_{GPS}-C_G)\cdot Kc/CFR]+Pf$$

where $C_C$ is the corrected course; $G_R$ is the yaw rate; $F_{MEAS}$ is the frequency of measurement of the yaw rate; $C_{GPS}$ is the course from the navigation information generated by the global positioning system receiver assembly; $C_G$ is the gyroscopic course; Kc is a variable filter value; CFR is a course filter resolution variable; and Pf is the previous course projected from a control point of the ground vehicle to the global positioning system receiver assembly.

50. The method as claimed in claim 46, wherein the gyroscope assembly comprises a single yaw gyroscope.

51. The method as claimed in claim 46, wherein the step of replacing the position and course stripped from the navigation information comprises calculating an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

52. The method as claimed in claim 51, wherein the off-track distance is determined using the equation:

$$D_{OT}=(H_A\cdot A/g)+D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

53. The method as claimed in claim 46, wherein the accelerometer assembly comprises a single accelerometer.

54. The method as claimed in claim 46, further comprising calculating the slope of non-level terrain, the slope being added to the corrected navigation information.

55. The method as claimed in claim 54, further comprising determining an effective track spacing of an implement towed by the ground vehicle using the slope.

56. The method as claimed in claim 55, wherein the effective track spacing is calculated by the formula:

$$E=I\cdot\cos(S)$$

where E is the effective track spacing, I is the track width of the implement on level terrain, and S is the slope.

57. A method for steering a ground vehicle traversing non-level terrain, comprising:
receiving a positioning signal from a global positioning system;

generating navigation information for the ground vehicle, the navigation information including a position and course for the ground vehicle;

replacing the position and course stripped from the navigation information with a corrected position and a corrected course that are inertially compensated for roll and yaw of the ground vehicle for providing corrected navigation information;

calculating the slope of non-level terrain, the slope being added to the corrected navigation information; and steering the ground vehicle using the corrected navigation information.

58. The method as claimed in claim 57, wherein the step of steering the ground vehicle using the corrected navigation information comprises steering the ground vehicle so that the ground vehicle follows a track substantially parallel to a previously navigated track.

59. The method as claimed in claim 57, wherein the step of replacing the position and course stripped from the navigation information comprises determining a yaw angle for the ground vehicle using a gyroscope assembly and determining lateral acceleration of the ground vehicle using an accelerometer assembly, the lateral acceleration and the yaw angle being used for generating the corrected position and course.

60. The method as claimed in claim 59, further comprising calculating a yaw rate and a gyroscopic course from the yaw angle.

61. The method as claimed in claim 60, wherein the corrected course is determined using the equation:

$$C_C = [G_R/F_{MEAS}] + [(C_{GPS} \cdot C_G) \cdot Kc/CFR] + Pf$$

where $C_C$ is the corrected course; $G_R$ is the yaw rate; $F_{MEAS}$ is the frequency of measurement of the yaw rate; $C_{GPS}$ is the course from the navigation information generated by the global positioning system receiver assembly, $C_G$ is the gyroscopic course; Kc is a variable filter value; CFR is a course filter resolution variable; and Pf is the previous course projected from a control point of the ground vehicle to the global positioning system receiver assembly.

62. The method as claimed in claim 59, wherein the gyroscope assembly comprises a single yaw gyroscope.

63. The method as claimed in claim 59, wherein the step of replacing the position and course stripped from the navigation information comprises calculating an off-track distance for the ground vehicle from the lateral acceleration generated by the accelerometer assembly and a distance due to high speed acceleration of the ground vehicle, the distance due to high speed acceleration being determined from changes in the position of the ground vehicle with respect to the course of the ground vehicle.

64. The method as claimed in claim 63, wherein the off-track distance is determined using the equation:

$$D_{OT} = (H_A \cdot A/g) + D_{HSA}$$

where $D_{OT}$ is the off-track distance of the ground vehicle; $H_A$ is the height of the accelerometer assembly above a control point of the ground vehicle; A is the lateral acceleration determined by the accelerometer assembly; g is the acceleration due to gravity; and $D_{HSA}$ is the distance due to high speed acceleration.

65. The method as claimed in claim 59, wherein the accelerometer assembly comprises a single accelerometer.

66. The method as claimed in claim 57, further comprising determining an effective track spacing of an implement towed by the ground vehicle using the slope.

67. The method as claimed in claim 66, wherein the effective track spacing is calculated by the formula:

$$E = I \cdot \cos(S)$$

where E is the effective track spacing, I is the track width of the implement on level terrain, and S is the slope.

* * * * *